United States Patent [19]

Mitchell

[11] 4,366,621
[45] Jan. 4, 1983

[54] APPARATUS FOR CUTTING VEGETATION

[75] Inventor: Albert W. Mitchell, Houston, Tex.

[73] Assignee: Emerson Electric Co., St. Louis, Mo.

[21] Appl. No.: 184,276

[22] Filed: Sep. 5, 1980

Related U.S. Application Data

[63] Continuation-in-part of Ser. No. 144,062, Apr. 28, 1980.

[51] Int. Cl.³ .................................................. A01D 50/00
[52] U.S. Cl. .......................................... 30/276; 56/12.7
[58] Field of Search ................... 30/276, 347; 56/12.7

[56] References Cited

U.S. PATENT DOCUMENTS

| | | | |
|---|---|---|---|
| 4,104,796 | 8/1978 | Sheldon | 30/276 |
| 4,236,312 | 12/1980 | Foster | 30/276 |
| 4,244,103 | 1/1981 | Sharr | 30/276 |
| 4,285,127 | 8/1981 | Zerrer | 30/276 |

Primary Examiner—Jimmy C. Peters
Attorney, Agent, or Firm—Hubbard, Thurman, Turner & Tucker

[57] ABSTRACT

Apparatus for cutting vegetation with a rotatable head carrying a non-metallic cutting line extended into a cutting plane. Additional line is extended from a supply line coil within the head into the cutting plane without independent operator action. A mechanism in the head automatically feeds replacement line whenever the free end of the cutting line is reduced to less than a predetermined length in the cutting plane. The mechanism is initiated when the cutting line length is less than this predetermined length. After initiation, the mechanism is self completing in a positive step-by-step mode of segmental line advancement.

13 Claims, 8 Drawing Figures

APPARATUS FOR CUTTING VEGETATION

RELATED APPLICATION

This application is a continuation-in-part of copending application Ser. No. 144,062 filed Apr. 28, 1980.

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In the United States of America, practical vegetation cutting devices using flexible, non-metallic lines carried upon a rotating head were developed. Examples of devices are shown in U.S. Pat. Nos. 3,708,967, 3,826,068, 4,052,789, 4,054,992, 4,067,108 and 4,104,797. These patented devices have met outstanding success in that these American developments provide safer electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by DC electric motors, a system to extend the cutting line from the head without interrupting cutting operations was desired.

A most desirable system would be capable of feeding cutting line as needed from the head so that line feeding is independent of operator action during grass cutting. Structures directed toward this purpose are shown in U.S. Pat. Nos. 3,895,440, 4,020,550 and 4,035,915. These structures have in common a basket-weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc., is arranged so that the line posts with such edge sever the free end of the cutting line when it is worn to an ineffective length. In practice, these structures are found to waste about 25 percent of the cutting line because of the excessive length of line severed at the post's edge, e.g., three inches.

Other line feeding structures are shown in U.S. Pat. Nos. 4,118,864 and 4,138,810. These mechanisms control spool rotation in line feeding functions by worm and spur gears having complex action in the vegetation cutting environment. Another line feeding mechanism is shown in U.S. Pat. No. 4,104,796 wherein speed sensitive cams control rotation of a spool within a cutting head.

Automatic cutting line feeding mechanisms have a common problem as to delay in feeding, overfeeding and excessive repeating or "machine gun feeding". This problem is particularly agrevating when the mechanism initiates and completes the cutting line extension cycle by sensing two set point conditions. For example, cams whose movement reflects one set point at a first rotary head speed and a second set point at a second rotary head speed tend to hunt, repeat and other malfunctions.

The present invention provides a rotating head with a simple mechanism that maintains the cutting line at its maximum preset length in the cutting plane irrespective of rates of cutting line wear or loss and without interrupting vegetation cutting or requiring independent operator action. The mechanism senses only one condition, e.g. speed of the rotating head to initiate the cutting line extension. However, the mechanism is self completing during cutting line extension.

SUMMARY OF THE INVENTION

In accordance with this invention, there is provided an apparatus for cutting vegetation which has a head rotatable about an axis of rotation. The head may carry in a cavity a coiled supply of a flexible non-metallic cutting line. The cutting line extends outwardly from the head through an aperture into a cutting plane. An escapement means is mounted for movement between a stable first position and an unstable second position. The escapement means in the first position secures the cutting line against extension from the head. The escapement means when the cutting line at its free end is less than a predetermined length, moves between the first position and the second position to uncoil the cutting line for extending an increment of the cutting line through the aperture into the cutting plane. Recoil means return the escapement means from the second position to the first position before the cutting line is extended completely to the predetermined length during the cutting of vegetation.

DESCRIPTION OF THE DRAWINGS

In these drawings, the several embodiments have common elements of construction in the cutting head. In regard to the several figures, like elements carry like numerals to simplify description of these embodiments in description of the present apparatus.

DESCRIPTION OF PREFERRED EMBODIMENTS

Figure 1:
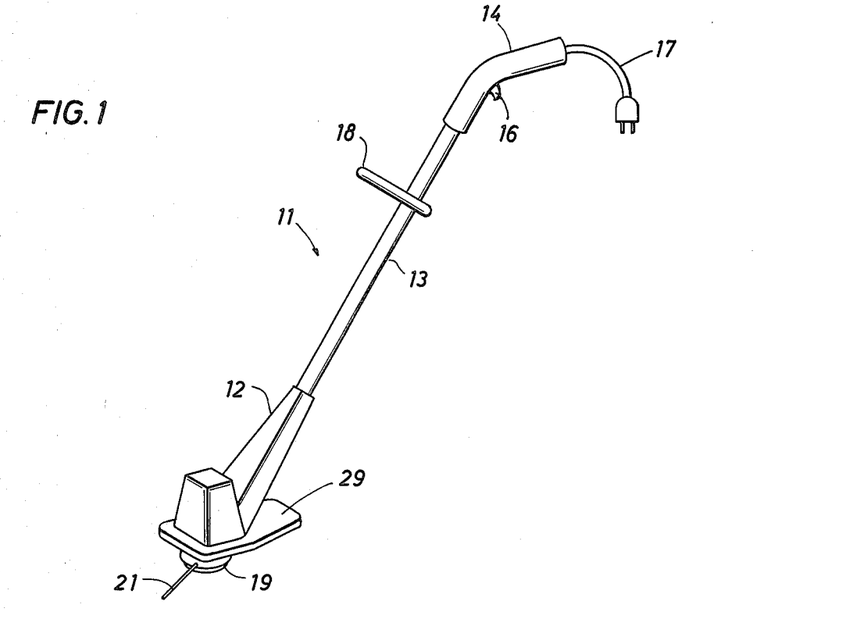
FIG. 1 is a pictorial view illustrating one embodiment of the apparatus for cutting vegetation arranged according to the present invention.

Referring to FIG. 1, there is shown an apparatus for cutting vegetation which is constructed in accordance with one embodiment of the present invention. In this particular embodiment, the apparatus is a grass trimmer 11, but it could be a lawn mower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a head 19 rotatable about an axis passing through the housing 12, and the cutting line 21 extends into a cutting plane which is substantially perpendicular to the axis of rotation of the head.

Figure 2:
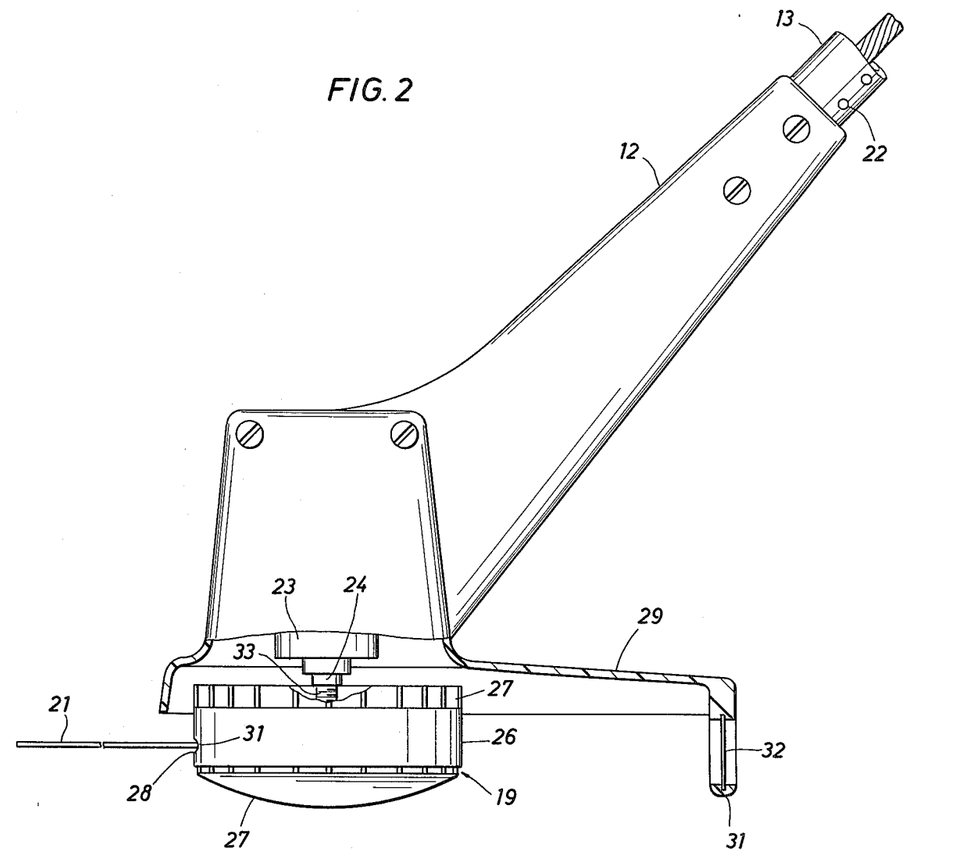
FIG. 2 illustrates in enlargement the lower portion of the apparatus shown in FIG. 1.

In FIG. 2 there is shown an enlargement of the housing 12 carrying a plurality of air induction openings 22 in the tube 13. These openings introduce a flow of cooling air over the motor contained in the housing 12. The housing 12 includes an electric motor 23 which has a downwardly-extending drave shaft 24. The head 19 is threadedly connected to the shaft 24. The upper surface of the head 19 may be surrounded by a plurality of vanes 27 serving as a centrifugal blower for moving air radially outwardly from the head 19 during its rotation. As a result, the induced flow of air cools the motor 23 within the housing 12. The head 19 includes a hub 26 and a cover 27. The hub 26 carries in its side peripheral surface an aperture 28 through which the cutting line 21 extends radially outwardly into the cutting plane. A metal bearing surface 30 may be placed at the aperture to protect the line 21 against undue wear and breakages. The cover 27 is releasably secured to the hub 26 by a threaded connection.

The housing 12 includes a rearwardly-extending tail part 29 which serves a protection to the user to prevent inadvertent contact with the rotating cutting line 21. Also, the tail part provides an automatic limit to any excessive extension of the cutting line 21 from the head 19. More particularly, the tail part 29 has a downwardly-extending projection 31 in which is embedded a metal cutting blade 32. As a result, the cutting line 21, when rotated in a cutting plane by the head 19, can never have an operating length greater than the distance from the axis of rotation to the cutting blade 32. Any greater length of cutting line is automatically severed by the blade 32.

The head 19, as seen in FIGS. 3–7, is disc-like with a smooth peripheral side surface carrying the aperture 28 through which the cutting line 21 extends into the cutting plane. If more than one cutting line is used, each line should have a separate aperture and bearing surface. The hub 26 in one face carries an adapter 35 with an integral metal sleeve having interior threads 33 in which the drive shaft 24 is secured by its threads 34. In addition, the adapter threads 33 extends axially a sufficient dimension in the head 19 to form a rigid and integral connection with the shaft 24. Preferably, the shaft 24 is cylindrical with a flat circular shoulder 36 above its lower terminus 37.

Figure 3:
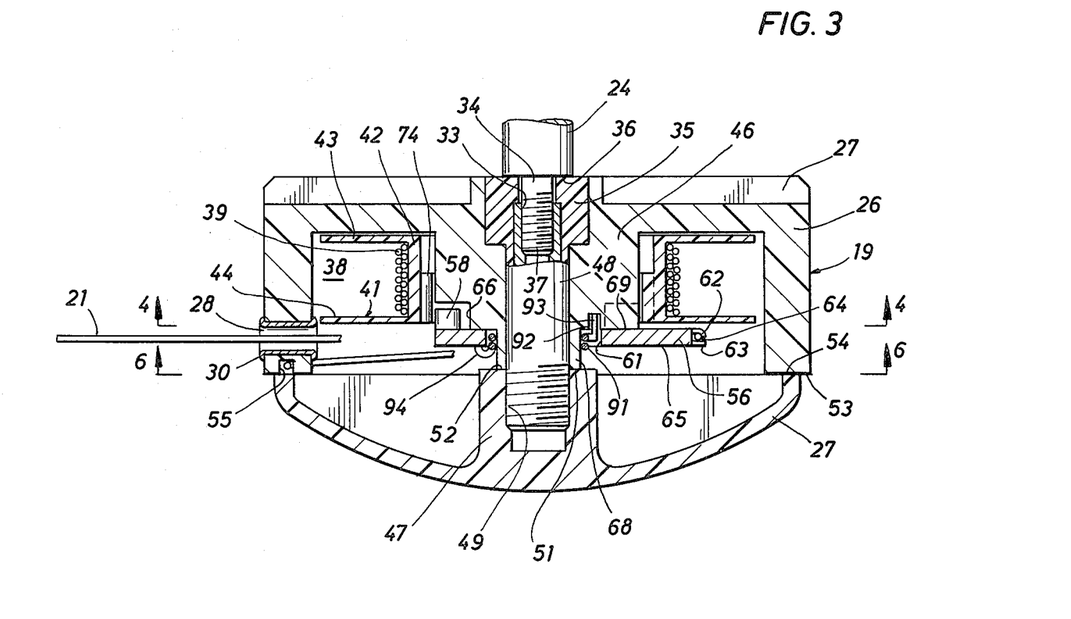
FIG. 3, is a vertical-section, in enlargement, taken axially through the cutting head of the apparatus shown in FIG. 2.
Figure 4:
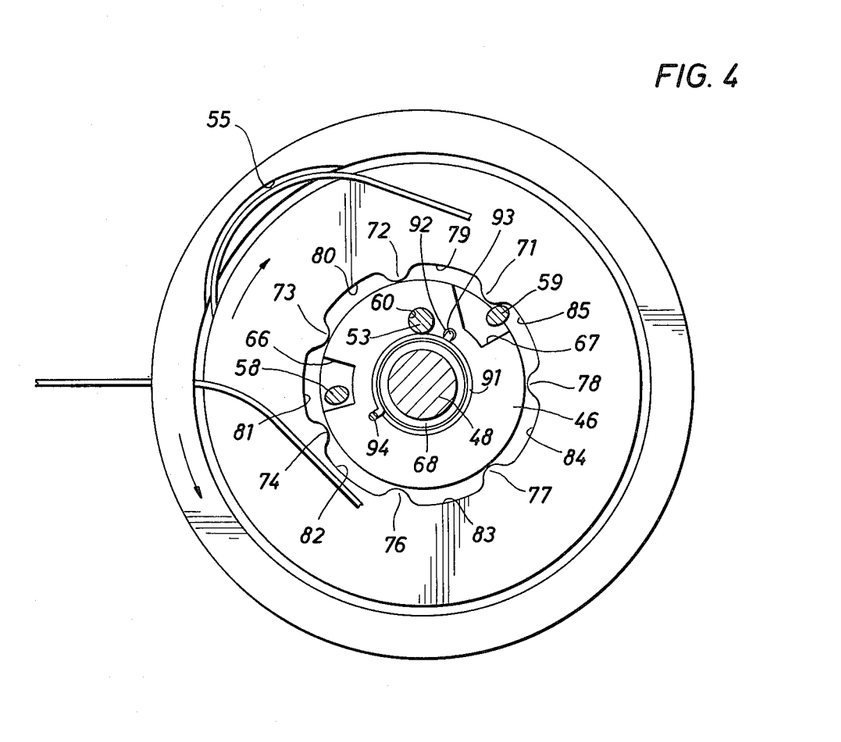
FIG. 4 is a cross-section of the cutting head as shown in FIG. 3, taken along line 4—4.

The exposed external surfaces of the head 19 should be smooth in surface contour, rounded at the edges and without substantial projections and recesses capable of trapping appreciable vegetation. Preferably, the cover 27 has a smooth exposed surface, is circular in configuration with rounded corners, and is coaxially aligned with the axis of rotation of the head 19.

The hub 26 forms a cylindrical cavity 38 in cooperation with the cover 27. A supply 39 of coiled cutting line is disposed within the cavity 38. The coiled cutting line is free for uncoiling by independent rotational and axial movements within the head 19. Preferably, the coiled cutting line is carried on a spool 41 mounted for rotation within the head.

Figure 8:
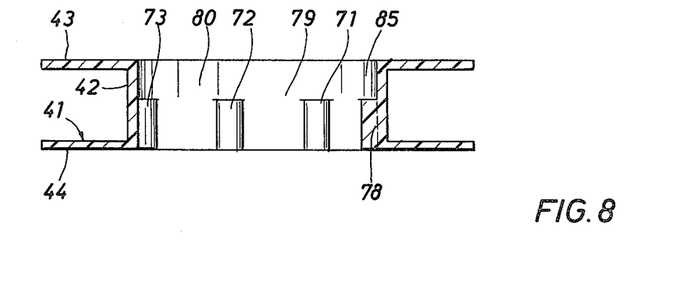
FIG. 8 is a cross-section of the spool used in the cutting head.

The spool has a tubular body 42 with flanges 43 and 44 defining a space receiving the supply 39 of cutting line. The spool 41 is journaled for free rotation in the head 19 by its mounting upon a cylindrical post 46 and axially secured by a post 47 carried upon the hub 26 and cover 27, respectively.

The cover 27 carries internal threads 49 which receive the threaded stud 48 formed on the lower part of the adapter 35 in the hub 26. The hub and cover have meeting surfaces 51 and 52 provided by a reduced collar 68 on post 46 and the post 47, and peripheral abutting planar surfaces 53 and 54. The cover is unthreaded for access to the cavity 38, perferably counter-directionally to head rotation to prevent unintended loosening. A series of peripheral ridges permit ready gripping of the cover for its threaded mounting on the hub.

The interior end of the coiled cutting line is secured to the spool 41. The cutting line passes from the spool 41 in a helical path through an acurate cut 55 in the hub 26, along the line control mechanism including an escapement cam 56 and then through the aperture 28. The free end of the cutting line 21 extends outwardly of the head 19 from the aperture 28. Preferably, the coiled cutting line supply 39 is wound codirectionally to the rotation of the head during vegetation cutting. This line winding arrangement avoids backlash problems and unintended uncoiling of cutting line when rotation of the head is suddenly induces.

In accordance with this invention, a fully automatic mechanism is provided to uncoil the cutting line within the head, and to extend the cutting line through the aperture into the cutting plane when the cutting line is shortened to less than the predetermined length.

More particularly, the mechanism provides for the positive segmental line advance by a controlled rotation of the spool 41 relative to the head 19 during vegetation cutting. An important feature of the mechanism is an escapement cam that provides a step-by-step rotation of the spool by sensing centrifugal force induced on the cutting line by head rotation and the force acting on the escapement cam resulting from changes in rotary speed at the head. Also, the escapement cam has a stable first position and an unstable second position. A recoil means returns the cam from the second position to the first position. Thus, the cam provides a self completing line feeding cycle once it is initiated by sensing the shortened cutting line.

In reference to FIGS. 3–7, an escapement cam mechanism is illustrated which provides the automatic but positive incremental extension, as needed, of the cutting line. The head 19 carries the escapement cam 56 in an off center pivot mounting which provides for swinging movement between a stable first position (shown in FIG. 6) and an unstable second position (shown in FIG. 7).

Figure 5:
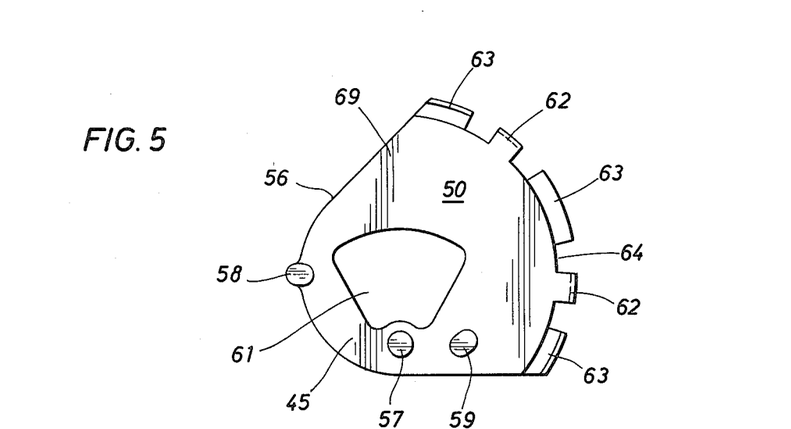
FIG. 5 is a top plan view of the escapement cam of the cutting head shown in FIG. 3.

The escapement cam 56 has a wedge-shape with an apex 45 at its small end and an enlarged portion 50 at its other end. The term wedge-shape is intended to include not only narrow angled members, but, also cams with included angles of 90 degrees or greater. Also, the enlarged portion preferably has a peripheral arcuate edge and good results are obtained with this edge being of a curve at the radius equal to the distance from the head's axis of rotation to the edge. However, the peripheral edge can have other configurations as will be apparent from the accompanying description.

The cam 56 has a central opening 61 which mounts about the neck 68 of the post 46. As a result, the cam mounts centrally within the head and swings between first and second positions upon an off center pivot relative to the post 46. More particularly, the cam 56 carries a pivot projection 57 adjacent its apex and the projection 57 is received loosely within a hole 60 in the post 46. Since the hole 60 is spaced from the axis head rotation, the cam 56 swings eccentrically between its first and second positions.

The cam 56 also carries projecting anchor pins 58 and 59 that are spaced to each side of the pivot projection 57. These anchor pins move radially inwardly and outwardly relative to recesses 66 and 67 formed into the end surfaces of the post 46.

Preferably, the cam 56 is planar and may be constructed of a rigid material of suitable strength, such as aluminum. The anchor pins can be cast or machined into the planar body of the cam and project normally from its top surface 69. Good results are provided where the anchor pins are round but preferably, the anchor pins are oval in cross-section for smooth operation.

The enlarged portion of the cam 56 has a peripheral edge with a longitudinal groove 64 to receive the cutting line 21 in that portion extending between the spool 41 and the aperture 28. The groove 64 may have unbroken edges, but preferably, as for weight savings, the groove 64 is provided by laterally offset projections 62 and 63 to contain the cutting line. The force arising from the cutting line extending from the rotating head 19 is applied through groove 64 (as on a pulley) to move the cam 56 sideways between the first and second positions.

The enlarged portion 50 of the cam 56 also provides adjacent the groove 64 of a counterbalance mass that provides a unique function in the present head. The mass of the cam 56 at its enlarged end 50 (without the cutting line acting upon it) is arranged to function with the off center pivoted mounting on projection 57 so that at normal operating rotary speeds, the cam 56 would move into the second position, wherein the cutting line is extended stepwise in a length from the rotating head 19.

However, a spring 91 biases the cam 56 into the first position. The spring 91 is held at one end 92 with an axial hole 93 in the post 46 and makes at least one counterclockwise turn (as viewed in FIGS. 4, 6 and 7). The other end of the spring 91 has a hook 94 that engages the cam 56 adjacent anchor pins 58. The spring 91 need not have great strength but merely provide sufficient force to return the cam 56 from the second position to the first position.

Stated in another manner, the spring 91 causes the cam 56 to rebound from the second position to the first position after cutting line extension begins but before it is completed.

The action of the cutting line in the groove 64 is to swing the cam 56 responsive to the centrifugal force acting upon the free end of the cutting line within the cutting plane.

When the cutting line 21 is at its predetermined maximum extended length into the cutting plane, the cam 56 is swung into its first position (FIG. 6) wherein the cutting line is secured against extension or feeding additional line from the head.

When the cutting line 21 is shortened to less than the desired predetermined maximum extended length, the effective centrifugal force of the cutting line is lessened, and the cam 56 swings into its second position (FIG. 7) and a length of cutting line is extended stepwise from the rotating head 19.

The cam 56 moves with a continuous motion between the first and second positions, because of the off center pivotal mounting of the cam 56 relative to the rotational axis of the head 19, the counterbalance mass, and the action of the spring 91 and the cutting line on the cam. This positive returning movement into the first position insures a proper and positive feeding of cutting line from the head once the cutting line feeding cycle is started. At no time, can the cam oscillate or hunt or "machine gun" between the first and second positions because the line feeding cycle is self completing.

Any mechanism can connect the cam 56 with the spool 41 for controlling its rotation relative to the head 19 in the self completing fashion. Preferably, a tooth and anchor pin arrangement is used. For this purpose, the spool 41 carries a plurality of radially inward facing teeth 71-74 and 76-78. These teeth at their inner ends provide bearing surfaces about the post 46 for coaxial rotation of the spool 41 relative to the hub 26. Preferably, the teeth are axially elongated and extend the length of the tubular body 42 of the spool 41.

The teeth 71-74 and 76-78 are separated by grooves 79-85. These grooves are of sufficient depth to provide clearance to the anchor pins when in their radial outward positions. As a result, the spool rotates freely until a tooth encounters an anchor pin in its position outward from the recesses on the post 46.

The teeth are dimensioned to be engaged by the anchor pins 57 and 58 when either pin is in its outward position. Of course, these teeth are disengaged by either pin when in its inward position and received within recesses 66 and 67 on the post 46. One anchor pin engages a tooth while the other pin is in the recess on the post 46.

Figure 6:
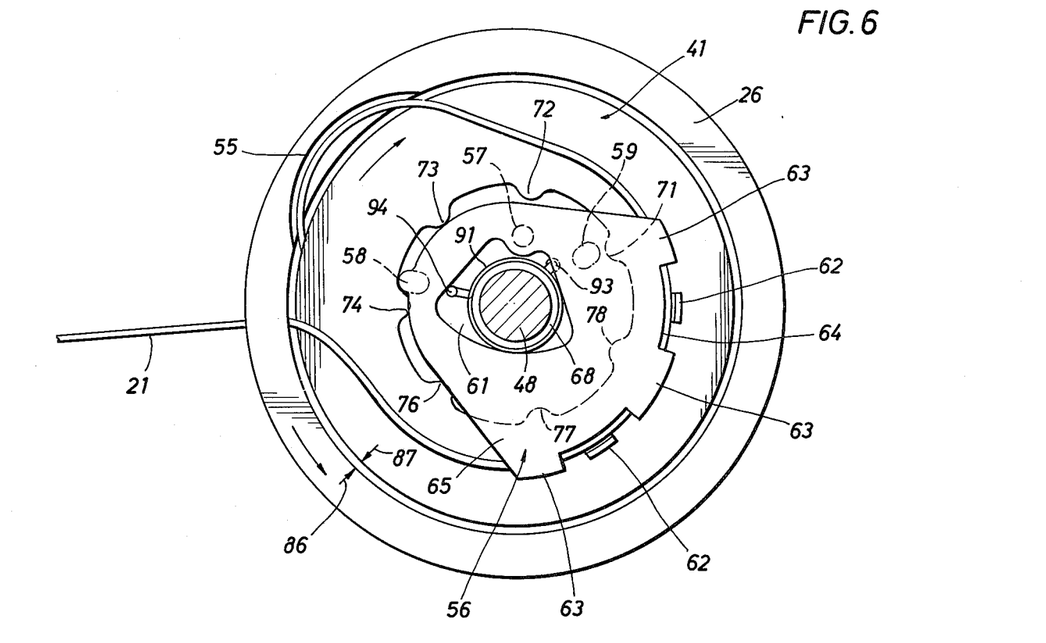
FIG. 6 is a cross-section taken on line 6—6 in FIG. 3 illustrating the escapement cam in a first position to prevent rotation of the spool carrying cutting line within the cutting head.

The teeth and anchor pins are angularly positioned to cooperate as an escapement to control rotation of the spool 41 as the cam 56 is swung sideways between the first and second positions. Referring to FIG. 6, the cam 56 is in the first position, and the anchor pin 58 engages the tooth 74 to secure the spool 41 against rotation to feed the cutting line from the head 19. At this time, the anchor pin 59 is in the recess 67.

Figure 7:
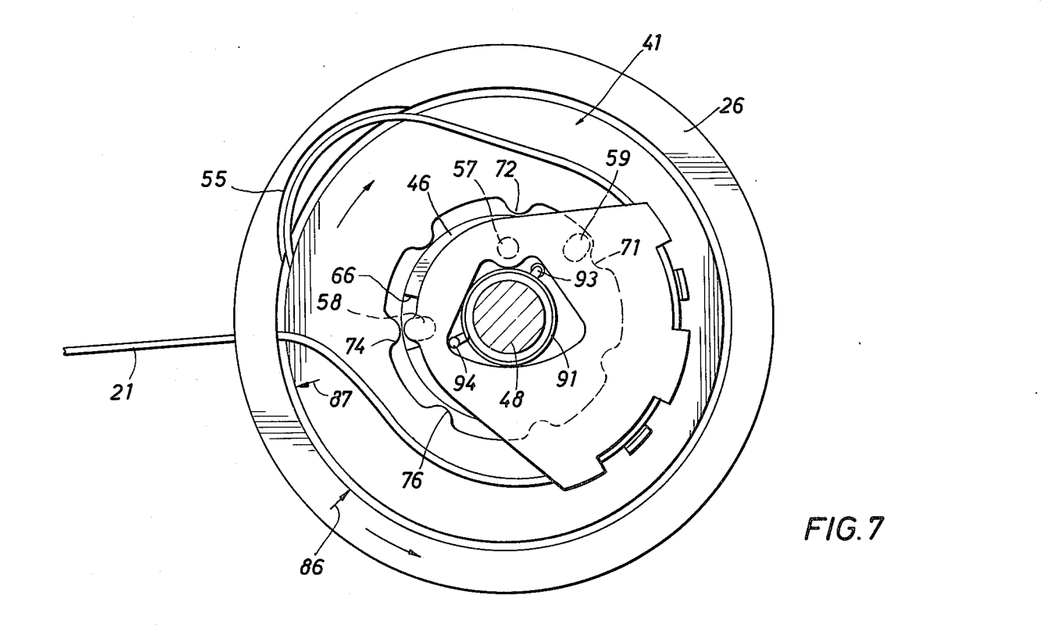
FIG. 7 is a cross-section like FIG. 6 but with the escapement cam in the second position to allow spool rotation to extend cutting line from the cutting head.

When the cutting line 21 is shortened to less than the predetermined maximum extended length in the cutting path, the cam 56 response to the lessened centrifugal force and swings into the second position as seen in FIG. 7. The anchor pin 58 has moved into the recess 66 and the spool 41 is rotated angularly until the tooth 72 in its outward position engages the anchor pin 59.

The spool rotates step-wise until the outward anchor pin stops the next approaching tooth. The cam 56 now is swung by the spring 91 into the first position irrespective if the cutting line 21 has now been extended completely to the desired extension into the cutting plane. If the cutting line is yet not fully extended to the predetermined maximum length from the head 19, the cam 56 again senses the lessened centrifugal force and swings toward the second position sufficiently to clear the anchor pin 58 from the adjacent tooth and returns by action of the spring 91 into the first position. The cam 56 has again swung between the first and second positions for feeding stepwise an additional length of cutting line from the rotating head. For each completed swing of the cam 56, the spool has rotated angularly a certain displacement shown by the index arrows 86 and 87. This successive feeding function of the cam 56 is the product of the off center pivoted mountings in coordination with the selected counterbalance mass, the cam recoil by the spring to the first position and the swinging action of the cam from the centrifugal force applied to it by the extended cutting line.

The spring 91 will have returned the cam into the first position even before the uncoil portion of the cutting line is completely extended from the rotating head. However, the cam will not pressure a shortened line even though the cutting line is yet being extended to full length. As the cutting line is extended, the head by added line drag slows in rotary speed and the head's deceleration acts to hold the cam in the first position. Once the angular velocity of the head is stabilized by the line extension being completed, the cam again can properly sense the initiation of cutting line feeding by the centrifugal forces acting upon the cam. If the cutting line is less in length than the predetermined maximum, the cam again will move between the first and second positions and initiate the cutting line feeding cycle. The action of the spring in returning the cam to the first position automatically completes the cycle of cutting line extension.

The cutting line uncoils by the controlled rotation of the spool in response to action of the cam. However, the uncoiled portion of the cutting line is not instantly fed from the rotating head into the cutting path. For example, the sliding of the cutting line in arcuate cut 55 produces a delay. Also, the sliding of the cutting line in the groove 64 about the cam 56 takes a finite time. Thus, the cam moves between the first and second positions and the spool rotates the finite angular displacement relatively more quickly than the uncoiled cutting line can became fully extended. However, the cam action is not induced for initiating a false cutting line feeding cycle.

Also, it is important to note that the cam 56 begins the feeding cycle by swinging from the first position to the second position only upon sensing the centrifugal forces representing a cutting line shortened to less than the predetermined length. The spring 91 causes the cam to return to the first position and therefore, the cutting line feeding cycle is self completing. Therefore, only one operating parameter produces cutting line extension, and that parameter is a shortened cutting line. No other parameter effects this line extension cycle and as a result, overfeeding, hesitation or "machine gun feeding" can not happen.

The cam 56 with the counterbalance mass also has a unique function in that not only is automatic line feeding obtained without operator intervention, but additional line feed (if needed) is induced by a start-stop operation of the trimmer 11, or other certain changes in rotary speed of the head 19.

As the head 19 accelerates from a stopped or very low speed condition, the counterbalance mass reacts to swing the cam 56 against spring 91 into the second position, but when the cutting line is fully extended, the spool is not released for rotation because of the counter swinging action of the cutting line on the cam. As the head 19 decelerates, the cam 56 is held in the first position so no feeding of the cutting line can occur. Thus, line feeding can be induced only at shortened cutting line lengths by a start-stop operation of the trimmer. However, the counterbalance mass at the enlarged end of the cam 56 must not be too great relative to action of the cutting line on the cam because the cam would shift against the spring 91 into the second position and feed cutting line each time the head 19 accelerates in rotary speed.

The eccentric swinging of the cam 56 provides for the anchor pins to be jammed against the teeth they engage upon the spool. The anchor pins move radially outwardly and through an arc intersecting the circle defining the teeth on the spool. As a result, the spool moves slightly counter-directionally to the direction for unwinding cutting line to release the cam for movement between the first and second positions. This unique function of the offcenter pivoted cam also tends to prevent over-feeding or ratcheting (machine-gunning) of the cam relative to the spool.

The feeding of the cutting line appears to involve some sliding of its portion contained in the groove 64. Assuming that the centrifugal force acting on the free end of the cutting line holds taut that portion of the cutting line between the groove 64 and aperture 28, then the cam 56 swinging into the second position (FIG. 7) requires the cutting line to slide in the groove 64. Stated in a different matter, the cam 56 in swinging into the second position must let the cutting line slide in the groove 64. Otherwise, the cutting line would be pulled inwardly into the head at its free end within the cutting path.

The teeth 71-74 and 76-78 are separated by grooves 79-85. These grooves are of sufficient depth to provide clearance to the anchor pins when in their radial outward positions. As a result, the spool rotates freely until a tooth encounters an anchor pin in its position outward from the recesses on the post 46.

Although the head 19 can be manufactured in various forms and of several materials, it is preferred to manufacture the hub 26 and cover 27 of plastic material, e.g., Nylon 6 polymer. The spool 41 and cutting line can be made of a similar material. The cam 56 can be made of a durable strong material, such as plastic (nylon), steel, aluminum or various metallic combination.

Although there has been described a particular arrangement of functions and elements in the various mechanisms employed in the head of the present invention, it is not intended that this description be the only possible arrangement of these elements to produce the results of the invention. In this regard, the functions and elements may be altered to produce the same results. All that is required for these elements is a mechanism which secures the line 21 from extension when at the predetermined maximum extended length in the cutting plane. Also, the mechanism must release the cutting line "as needed" when the cutting line has been reduced by wear or loss, to length less than the desired maximum length. In addition, the mechanism provides for the automatic extension of the cutting line with a few relatively simple and inexpensive escapement elements.

From the foregoing, it will be apparent that there has been provided a novel apparatus for cutting vegetation which provides a novel apparatus for cutting vegetation which provides a convenient and safe means for extending automatically cutting line without the individual attention of the operator. It will be appreciated that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation, comprising:
a head rotatable about an axis of rotation, said head having at least one peripheral aperture;
said head carrying a cavity providing a storage area for cutting line;
a supply of cutting line disposed in said cavity, said cutting line being flexible and with a free end extending outwardly from said head through said aperture into a cutting plane;
an escapement cam mounted on said head for movement between first and second positions, said escapement cam including means for preventing movement of said cutting line for extension into said cutting plane when said escapement cam is in at least said first position, said means being operable to release predetermined incremental lengths of cutting line for extension into said cutting plane in response to movement of said escapement cam between said first and second positions;
means on said escapement cam engageable with a portion of said cutting line and responsive to a force tending to extend said cutting line into said cutting plane to be urged in said first position, said escapement cam being responsive to a shortening of said cutting line at said free end to less than a predetermined length during rotation of said head to move to said second position to effect release of an incremental length of cutting line for extension into said cutting plane; and
recoil means engaged with said escapement cam for urging said escapement cam from said second position toward said first position.

2. The apparatus of claim 1 wherein said recoil means provides a biasing force for preventing said escapement cam from assuming a steady state in resting in said second position.

3. The apparatus of claim 1 wherein said recoil means is a spring for urging said escapement cam from said second position.

4. The apparatus of claim 3 wherein said spring provides sufficient force against said escapement cam that the movement of said escapement cam is substantially continuous between said first position and said second position.

5. The apparatus of claim 1 wherein the movement of said escapement cam is continuous between said first position and said second position and is substantially completed before the extension of said cutting line occurs from said head during the cutting of vegetation.

6. The apparatus of claim 1 wherein said escapement cam moves from said first position to said second position during acceleration of said head and said recoil means immediately returns said escapement cam into said first position before the extension of said cutting line results in deceleration of said head.

7. An apparatus for cutting vegetation, comprising:
a head rotatable about an axis of rotation, said head having at least one peripheral aperture;
said head carrying a cavity providing a storage area for cutting line;
a supply of coiled cutting line disposed on a spool rotatably mounted in said cavity, said cutting line being flexible and with a free end extending outwardly from said head through said aperture into a cutting plane;
escapement means pivotally mounted on said heat and engageable with said spool in at least a first position of said escapement means to prevent rotation of said spool to uncoil said cutting line, said escapement means being adapted for pivotal movement between said first position and a second position to release said spool for limited rotation for uncoiling incremental lengths of cutting line from said spool for extension into said cutting plane;
said escapement means being engageable with a portion of said cutting line and responsive to a force tending to extend said cutting line into said cutting plane to be urged in said first position, said escapement means being responsive to a shortening of said cutting line at said free end to less than a predetermined length during rotation of said head to move to said second position to effect release of said spool for rotation to feed an incremental length of cutting line from said spool for extension into said cutting plane; and
recoil means engaged with said escapement means for urging said escapement means from said second position toward said first position to release said spool for rotation to feed an additional incremental length of cutting line from said spool for extension into said cutting plane.

8. The apparatus of claim 7 wherein said escapement means and said spool carry teeth means for cooperating in regulating rotation of said spool relative to said head.

9. The apparatus of claim 7 wherein said recoil means is a spring for urging said escapement means from said second position.

10. The apparatus of claim 9 wherein said spring provides sufficient force that movement of said escapement means is substantially continuous between said first position and said second position.

11. An apparatus for cutting vegetation, comprising:
a head rotatable about an axis of rotation and said head having at least one peripheral aperture;
said head carrying a cavity providing a storage area for cutting line;
a supply of coiled cutting line disposed in said cavity, and said cutting line being flexible and non-metallic with a free end extending outwardly from said heat through said aperture into a cutting plane;
an escapement cam in a first position securing said cutting line from extension through said aperture into the cutting plane when said free end has a predetermined maximum length;
said escapement cam moving between said first position and a second position for uncoiling an increment of said cutting line and extending said cutting line through said aperture into the cutting plane;
off center pivot means for swinging said escapement cam between said first position and said second position during head rotation whenever said cutting line is shortened at said free end to less than the predetermined maximum length, said escapement cam moving from said first position to said second position during acceleration of said head; and recoil means for immediately returning said escapement cam from said second position to said first position before the extension of said cutting line results in deceleration of said head whereby said cutting line is extended in length during the cutting of vegetation.

12. The apparatus of claim 11 wherein said recoil means is a spring for urging said escapement cam from said second position.

13. The apparatus of claim 12 wherein said spring provides sufficient force against said escapement cam that the swinging movement is substantially continuous between said first position and said second position.

UNITED STATES PATENT AND TRADEMARK OFFICE
CERTIFICATE OF CORRECTION

PATENT NO. : 4,366,621

DATED : January 4, 1983

INVENTOR(S) : Albert W. Mitchell

It is certified that error appears in the above-identified patent and that said Letters Patent is hereby corrected as shown below:

Column 7, line 22, "pressure" should be --presense--.

Column 10, line 10, "heat" should be --head--.

Signed and Sealed this

Twenty-seventh Day of December 1983

[SEAL]

Attest:

GERALD J. MOSSINGHOFF

*Attesting Officer*   *Commissioner of Patents and Trademarks*